United States Patent [19]

Hayasaki

[11] Patent Number: 4,939,958
[45] Date of Patent: Jul. 10, 1990

[54] FAIL-SAFE HYDRAULIC CONTROL FOR A FORWARD CLUTCH IN A CONTINUOUSLY VARIABLE TRANSMISSION

[75] Inventor: Koichi Hayasaki, Fujisawa, Japan
[73] Assignee: Nissan Motor Co., Ltd., Yokohama, Japan
[21] Appl. No.: 291,262
[22] Filed: Dec. 28, 1988
[30] Foreign Application Priority Data
  Dec. 28, 1987 [JP] Japan .................. 62-329669
[51] Int. Cl.$^5$ ............................ B60K 41/12
[52] U.S. Cl. ........................ 74/867; 74/568
[58] Field of Search ........... 74/866, 867, 868, 863, 74/752, 730, 731, 732, 733; 192/85 AA

[56] References Cited

U.S. PATENT DOCUMENTS

| 2,693,711 | 11/1954 | Kelbel et al. | 74/732 |
| 2,733,732 | 2/1956 | Baker, Jr. | 74/867 |
| 2,929,267 | 3/1960 | Wilson | 74/731 |
| 3,699,994 | 10/1972 | Mohri | 74/863 |
| 4,735,113 | 4/1988 | Yamamuro et al. | 74/866 |

FOREIGN PATENT DOCUMENTS 52-08261  1/1977  Japan ........................ 74/867

Primary Examiner—Dwight Diehl
Assistant Examiner—Khoi Q. Ta
Attorney, Agent, or Firm—Foley & Lardner, Schwartz, Jeffery, Schwaab, Mack, Blumenthal & Evans

[57] ABSTRACT

A hydraulic pressure control system for a transmission comprises a pressure reduction valve which regulates fluid supply to an output hydraulic fluid line from an input hydraulic fluid line and fluid discharge from the output hydraulic fluid line to a drain hydraulic fluid line. In order to assure an inflow of hydraulic fluid to the output hydraulic fluid line, there is provided an orifice connected between the input hydraulic fluid line and the output hydraulic fluid line. A relief valve is provided at the drain hydraulic fluid line to restrain discharge of hydraulic fluid from the drain hydraulic fluid line. Thus even if the pressure reduction valve is sticked, there remains hydraulic fluid pressure in the output hydraulic fluid line.

5 Claims, 4 Drawing Sheets

FAIL-SAFE HYDRAULIC CONTROL FOR A FORWARD CLUTCH IN A CONTINUOUSLY VARIABLE TRANSMISSION

RELATED APPLICATION

U.S. Pat. No. 4,735,113 issued to Yamamuro et al. on Apr. 5, 1988 which claims priority based on Japanese Patent Application Ser. No. 59-226706 which is now laid-open under JP No. 61-105351.

BACKGROUND OF THE INVENTION

The present invention relates to a hydraulic pressure control system for a transmission.

U.S. Pat. No. 4,735,113 discloses a continuously variable transmission including a V-belt type continuously variable transmission mechanism and a forward/reverse selector mechansim. The V-belt type continuously variable transmission mechanism includes a driver pulley and a follower pulley which are drivingly interconnected by a V-belt. The driver and follower pulleys are hydraulically operated in response to hydraulic fluid pressures supplied to a driver pulley servo cylinder chamber and a follower pulley servo cylinder chamber. Supplied always to the follower pulley servo cylinder chamber is a so-called line pressure generated by a pressure regulator valve that effects pressure regulation of pressurized hydraulic fluid discharged by a source of hydraulic fluid pressure. Hydraulic fluid pressure within the driver pulley cylinder chamber is regulated by a shift control valve. The shift control valve regulates fluid supply to the driver pully servo cylinder chamber and fluid discharge therefrom in response to an operating position of a shift actuator controlled by a control unit. The forward/reverse selector mechanism includes a forward clutch and a reverse brake which are hydraulically connected to a manual valve which is supplied with a throttle pressure generated by a throttle valve. The throttle valve is supplied with the line hydraulic fluid pressure and effects pressure reduction to deliver the throttle pressure. When the manual valve is placed at a reverse drive range, the throttle pressure is supplied to the reverse brake, while the forward clutch is drained. When the manual valve is placed at a forward drive range, the throttle pressure is supplied to the forward clutch, while the reverse brake is drained.

However, this known hydraulic control system poses a problem that if the throttle valve fails to operate, no hydraulic fluid pressure would be supplied to the forward clutch nor the reverse brake, so that the vehicle cannot continue running. More specifically, if the throttle valve becomes stuck due to dust entrained in the hydraulic fluid and fails to deliver any hydraulic fluid pressure, no hydraulic fluid pressure is supplied to the forward clutch nor the reverse brake. Thus, the vehicle cannot travel forward nor reverse.

An object of the present invention is to provide a hydraulic pressure control system for a transmission which provides a safeguard against the above-mentioned accident.

SUMMARY OF THE INVENTION

According to the present invention, the above-mentioned problem is solved by always supplying hydraulic fluid pressure to an output hydraulic fluid line of a pressure reduction valve via an orifice, that is provided to supply a reduced hydraulic pressure to a frictional device of a transmission, and by providing a relief valve at a drain hydraulic fluid line of the pressure reduction valve. More specifically, in a hydraulic pressure control system according to the present invention, there is provided an orifice connection between a hydraulic fluid line communicating with a source of hydraulic fluid pressure and an output hydraulic fluid line where a reduced hydraulic pressure generated by a pressure reduction valve develops, and a relief valve is provided in a fluid discharge line where hydraulic fluid discharged from the pressure regulator passes through during pressure regulation by the pressure reduction valve so as to keep hydraulic pressure within the hydraulic fluid discharge line above a predetermined value.

According to the present invention, there is provided a hydraulic pressure control system for a transmission having a frictional device which is hydraulically activated in response to a hydraulic fluid pressure build-up which includes, a source of regulated hydraulic fluid pressure; a pressure reduction valve having a first hydraulic fluid line connectable to the frictional device, a second hydraulic fluid line connected to said source of regulated hydraulic fluid pressure, and a third hydraulic fluid line, said pressure reduction valve including means for regulating fluid supply to said first hydraulic fluid line from said second hydraulic fluid line and fluid discharge from said first hydraulic fluid line to said third hydraulic fluid line to said third hydraulic fluid line thereby controlling hydraulic fluid pressure build-up in said first hydraulic fluid line, means defining an orifice connecting said first hydraulic fluid line to said second hydraulic fluid line, means for restraining discharge of hydraulic fluid from said third hydraulic fluid line to keep hydraulic fluid pressure in said third hydraulic fluid line above a predetermined value.

DETAILED DESCRIPTION OF THE INVENTION

First Embodiment

Figure 2:
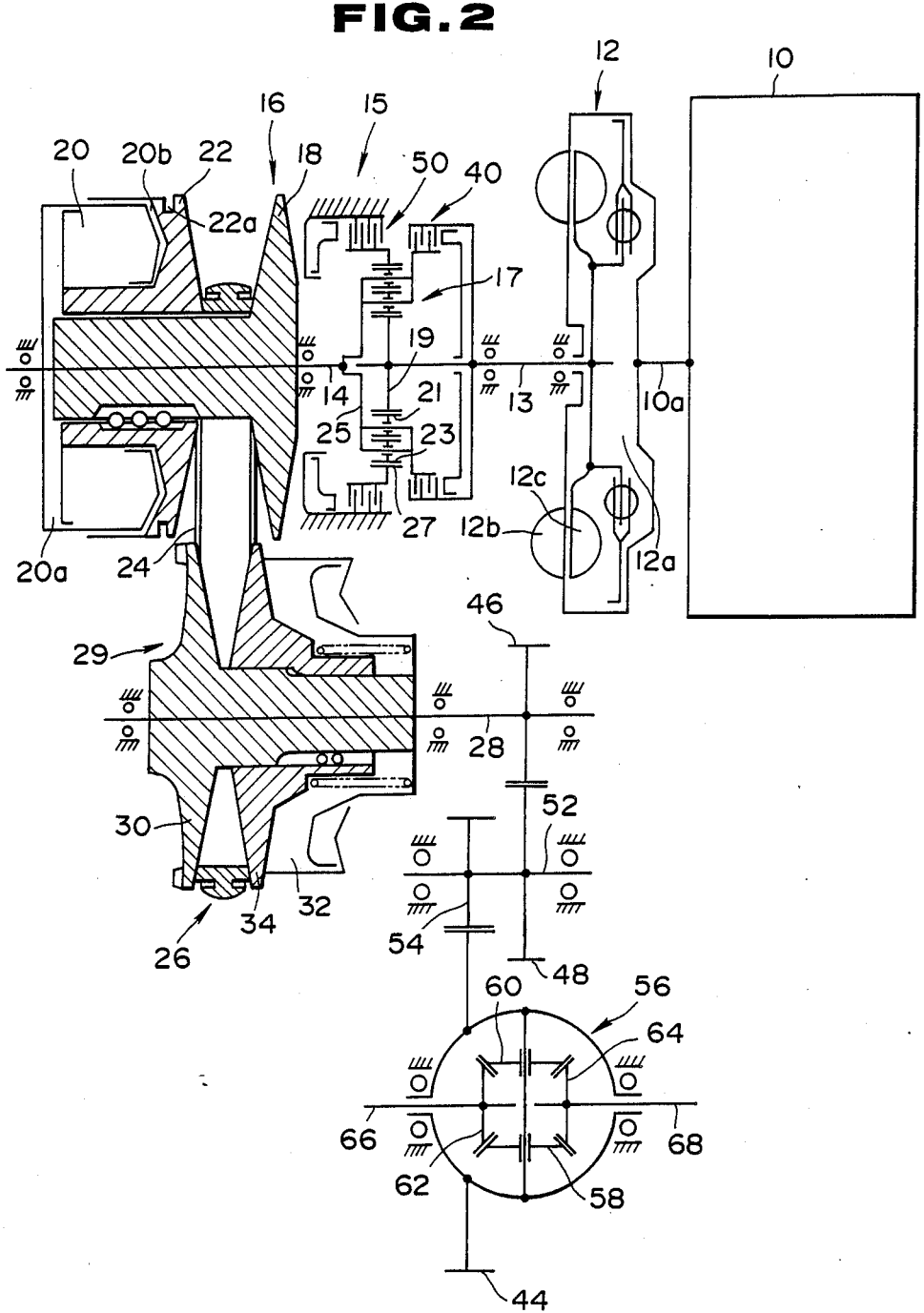
FIG. 2 is a schematic diagram showing a V-belt type continuously variable transmission mechanism.

Referring to FIG. 2, a power transmission mechanism of a continuously variable transmission is described. This continuously variable transmission comprises a fluid coupling 12, a forward/reverse selector mechanism 15, a V-belt type continuously variable transmission mechanism 29, and a differential gearing 56. The fluid coupling 12 includes a lock-up hydraulic chamber 12a, a pump impeller 12b, and a turbine runner 12c. The continuously variable transmission also comprises a rotary shaft 13, a driver pulley shaft 14, a driver pulley 16, a planetary gearing mechanism 17, a V belt, a follower pulley 26, a follower shaft 28, a driver gear 46, an idler gear 48, an idler shaft 52, a pinion gear 54, a final gear 44, a pinion gear 58, a pinion gear 60, a side gear 62, a side gear 64, an output shaft 66, and an output shaft 68. The driver pulley 16 includes an axially stationary conical disk 18, a driver pulley servo cylinder chamber 20, and an axially movable conical disk 22 formed with a circumferential groove 22a. The driver pulley cylinder chamber 20 includes chambers 20a and 20b. The planetary gearing mechanism 17 includes a sun gear 19, a pinion carrier 25 carrying pinion gears 21 and 23, and a ring gear 27. The follower pulley 26 includes an axially stationary conical disk 30, a follower pulley cylinder chamber 32, and an axially movable conical disk 34. For detailed description of the transmission mechanism, reference should be made to the before mentioned U.S. Pat. No. 4,735,113 issued to Yamamuro et al on Apr. 5, 1988 which has been hereby incorporated by reference in its entirety.

Figure 1A:
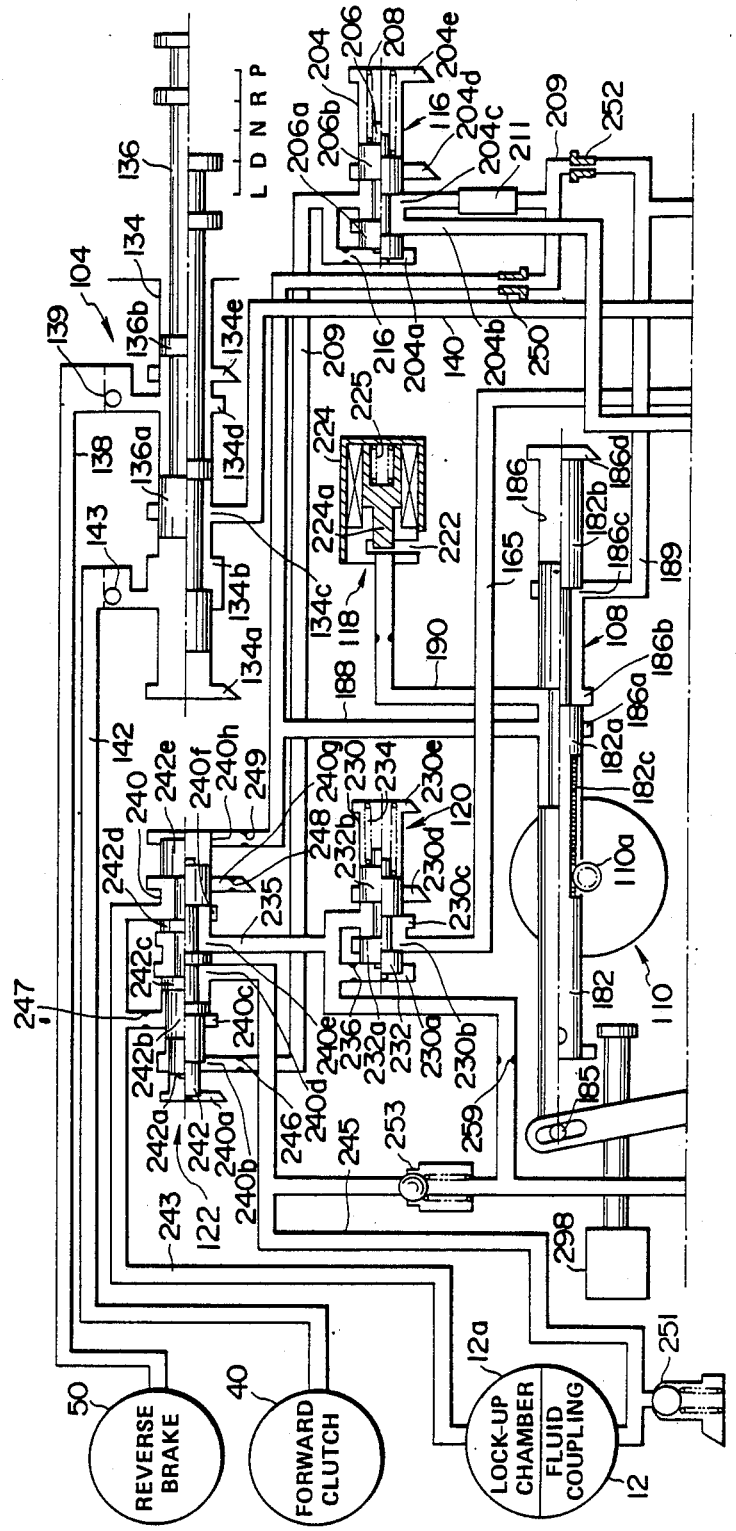
FIGS. 1A and 1B, when combined, are a hydraulic circuit diagram of a hydraulic pressure control system including a first embodiment according to the present invention.
Figure 1B:
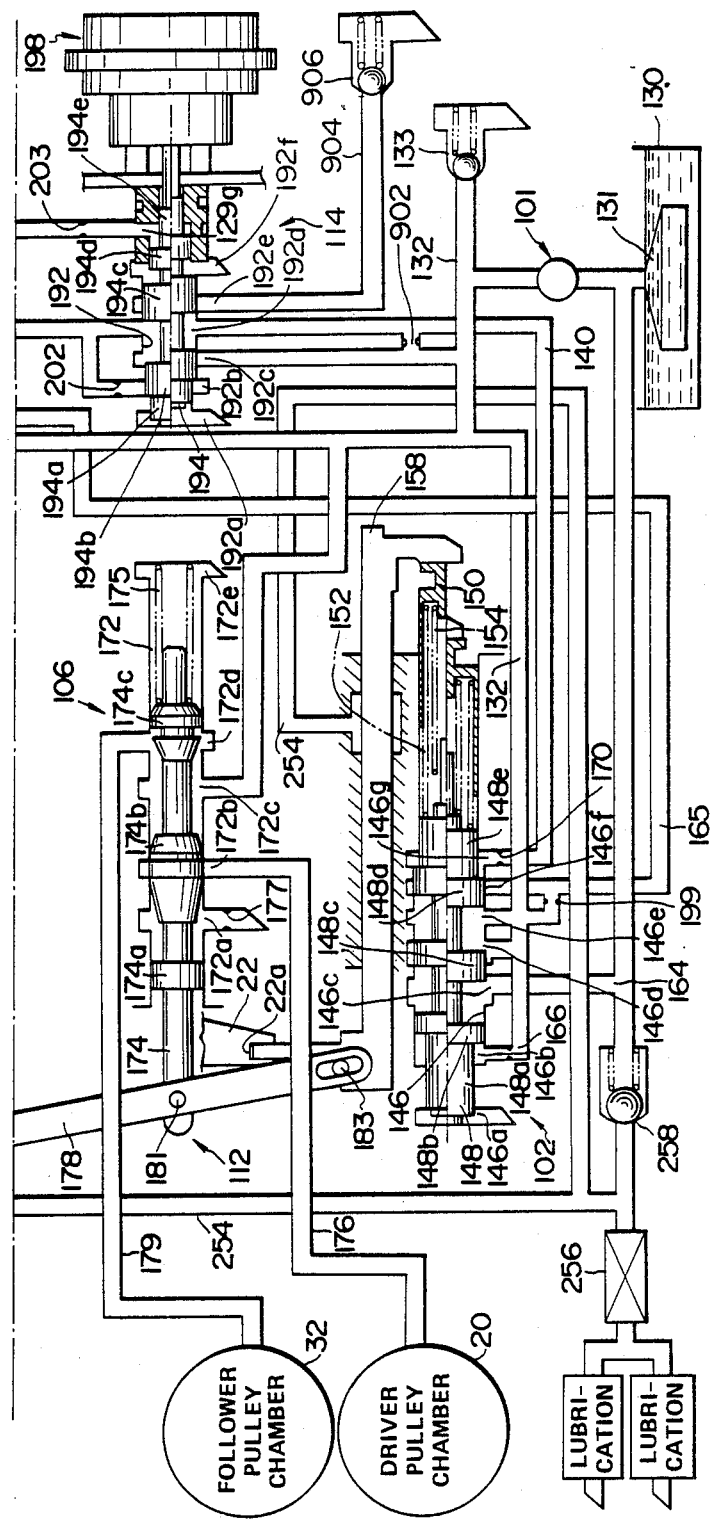

The hydraulic pressure control system for the continuously variable transmission is shown in FIGS. 1A and 1B. The hydraulic pressure control system comprises an oil pump 101, a line pressure regulator valve 102, a manual valve 104, a shift control valve 106, an adjustment pressure changeover valve 108, a shift motor in the form of a stepper motor 110, a shift operating mechanism 112, a throttle valve 114, a constant pressure regulator valve 116, an electromagnetic valve 118, a coupling pressure regulator valve 120, a lock-up control valve 122. They are hydraulically interconnected as shown in FIGS. 1A and 1B. They are hydraulically connected also to the forward clutch 40, reverse brake 50, fluid coupling 12, lock-up hydraulic chamber 12a, driver pulley cylinder chamber 20, and follower pulley cylinder chamber 32 as illustrated in FIGS. 1A and 1B. Detailed description of the hydraulic component parts except the throttle valve 114 is hereby omitted. For full understanding of the hydraulic pressure control system shown in FIGS. 1A and 1B, reference should be made to U.S. Pat. No. 4,735,113.

Referring to FIGS. 1A and 1B, the throttle valve 114 comprises a spool 194 inserted into a valve bore 192. The valve bore 192 is formed with various ports 192a to 192g. The spool 194 includes various lands 194a to 194e. The ports 192a and 192f are drain ports, respectively. The ports 192b and 192d are connected to a throttle pressure hydraulic fluid line (which may be generally referred to as an output hydraulic fluid line for a reduced hydraulic pressure generated). The port 192c is connected to a line pressure hydraulic fluid line 132 (which may be referred to as an input hydraulic fluid line or a hydraulic fluid pressure source line). There is provided an orifice 902 which provides a hydraulic fluid connection between the fluid lines 132 and 140. The port 192e is connected to a hydraulic fluid line 904. Via this port 192e, hydraulic fluid is discharged from the throttle valve 114 to effect pressure regulation therein. The hydraulic fluid discharged from the port 192e flows through the hydraulic fluid line 904 which is drained via a ball type relief valve 906. The setting of the relief valve 906 is such that it is opened when the hydraulic fluid pressure within the fluid line 904 is greater than a predetermined value. This predetermined value is set lower than the minimum value of the throttle pressure generated by the throttle valve 114. The port 192g is connected to a hydraulic fluid line 189. The spool 194 is subject to a bias force variable in inverse proportion to the magnitude of engine manifold vacuum.

The operation of this embodiment is described. Normally, the throttle valve 114 effects pressure regulation by discharging a portion of hydraulic fluid supplied to the port 192c from the line pressure hydraulic fluid line 132 to generate the throttle pressure at the port 192d connected to the throttle pressure hydraulic line 140. The portion of hydraulic fluid is discharged from the port 192e. The magnitude of the throttle pressure is variable in response to the bias force by the vacuum diaphragm 198 which the spool 194 is subject to. In the hydraulic fluid line 189, a so-called adjustment pressure develops under the control of the electromagnetic valve 118. This adjustment pressure is the maximum constant value which is determined by the constant pressure regulator valve 116 until a vehicle speed exceeds a predetermined value, while it takes an appropriate value between zero and the above-mentioned maximum value when the vehicle speed is lower than the predetermined value. The detailed description of the adjustment pressure is described in U.S. Pat. No. 4,735,113. The adjustment pressure is supplied to the port 129g to bias the spool 194 in such a direction as to increase the magnitude of the throttle pressure in response to an increase in the magnitude of the adjustment pressure. Since as mentioned before, the hydraulic fluid is discharged from the port 192e to the hydraulic fluid line 904 to be drained via the relief valve 906. Thus, the hydraulic fluid pressure in the hydraulic fluid line 904 and the port 192e is kept at the before-mentioned predetermined value. This predetermined value is set lower than the minimum value of the throttle pressure, so that the provision of the relief valve 906 does not have any side effect on the pressure regulation by the throttle value 114.

The throttle pressure hydraulic fluid line 140 is connected to a port 134c of the manual valve 104 which has a port 134b connected to the forward clutch 40 via a hydraulic fluid line 142 and a port 134d connected to the reverse brake 50 via a hydraulic fluid line 138.

Let us now consider the case when the spool 194 is stuck in a position where the land 194b closes the port 192c. In this case, no hydraulic fluid can flow from the port 192c to the port 192d. However, since the line pressure hydraulic fluid line 132 is connected to the throttle pressure hydraulic fluid line 140 via the orifice 902, there remains a supply of hydraulic fluid to the throttle pressure hydraulic fluid line 140. Since in this position of the spool 194 there is opened fluid communication between the line pressure hydraulic fluid line 140 and the hydraulic fluid line 904, the hydraulic fluid pressure in the throttle pressure hydraulic fluid line 140 is kept at the predetermined value which the relief valve 906 is opened at. Therefore, the hydraulic fluid pressure in the throttle pressure hydraulic fluid line 140 is maintained at the predetermined value even if the spool 194 is stuck to the above-mentioned position. In this case, the magnitude of hydraulic fluid pressure supplied via the hydraulic fluid line to the forward clutch 40 is lower than the minimum value of the normal throttle pressure. Thus, the force which engages forward clutch 40 is not sufficiently large so that the forward clutch 40 cannot show sufficiently large torque capacity. However, since with the hydraulic fluid pressure at the predetermined value the forward clutch 40 is kept engaged, the vehicle can continue running if the engine output is held low. Thus for example, the vehicle can travel to a repair shop.

Since the line pressure hydraulic fluid line 132 is always connected to the hydraulic fluid line 140 via the orifice 902, there is an inflow of hydraulic fluid from the hydraulic fluid line 132 to the hydraulic fluid line even if the throttle valve 114 is in its normal operation state. Thus, the hydraulic fluid coming into the hydraulic fluid line 140 is always discharged to the hydraulic fluid line 904, keeping the relief valve 906 at its open state. In this manner, by keeping the relief valve 906 always opened prevents the occurrence of hydraulic fluid pulsation resulting from a repitition of opening closing of the relief valve 906.

Second Embodiment

Figure 3:
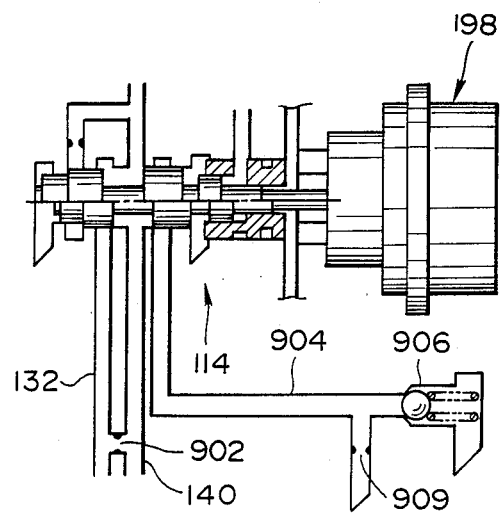
FIG. 3 is a fragmentary circuit diagram showing a second embodiment according to the present invention.

FIG. 3 shows the second embodiment according to the present invention. This embodiment is substantially the same as the first embodiment except the provision of a bleed orifice 909 opening at a hydraulic fluid line 904. However, in this embodiment, a relief valve 906 is kept closed when a throttle valve 114 operates normally since hydraulic fluid coming into the hydraulic fluid line 140 via an orifice 902 is drained via the bleed orifice 909 after having past the hydraulic fluid line 904. Therefore, the occurrence of hydraulic fluid pressure pulsation owing to opening/closing of the relief valve 906 is prevented.

In the previous embodiments, the present invention has been embodied in the continuously variable transmission including the pressure reduction valve in the form of a throttle valve. The present invention may be applied to an ordinary step speed transmission as long as it has a pressure reduction valve having its output fluid pressure supplied to a frictional device.

What is claimed is:

1. In a hydraulic pressure control system for a transmission having a frictional device which is hydraulically activated in response to a hydraulic fluid pressure build-up therein:

a source of regulated hydraulic fluid pressure;

a pressure reduction valve assembly having a first hydraulic fluid line connectable to the frictional device, a second hydraulic fluid line connected to said source of regulated hydraulid fluid pressure, and a third hydraulic fluid line, said pressure reduction valve assembly including regulating means for regulating fluid supply to said first hydraulic fluid line from said second hydraulic fluid line and fluid discharge from said first hydraulic fluid line to said third hydraulic fluid line thereby controlling a hydraulic fluid pressure build-up in said first hydraulic fluid line;

wherein said regulating means comprises an orifice connecting said first hydraulic fluid line to said second hydraulic fluid line;

means for restraining discharge of hydraulic fluid from said third hydraulic fluid line to keep hydraulic fluid pressure in said third hydraulic fluid line above a predetermined value.

2. A hydraulic pressure control system as claimed in claim 1, wherein said restraining means include a relief valve provided in said third hydraulic fluid line.

3. A hydraulic pressure control system as claimed in claim 2, wherein said restraining means also includes a bleed orifice connected to said third hydraulic fluid line intermediate said pressure reduction valve assembly and said relief valve.

4. A hydraulic pressure control system as claimed in claim 1, wherein said source include a line pressure regulator valve.

5. A hydraulic pressure control system as claimed in claim 1, wherein said pressure reduction valve assembly is a throttle valve responsive to engine manifold vacuum.

* * * * *